(No Model.) 2 Sheets—Sheet 2.

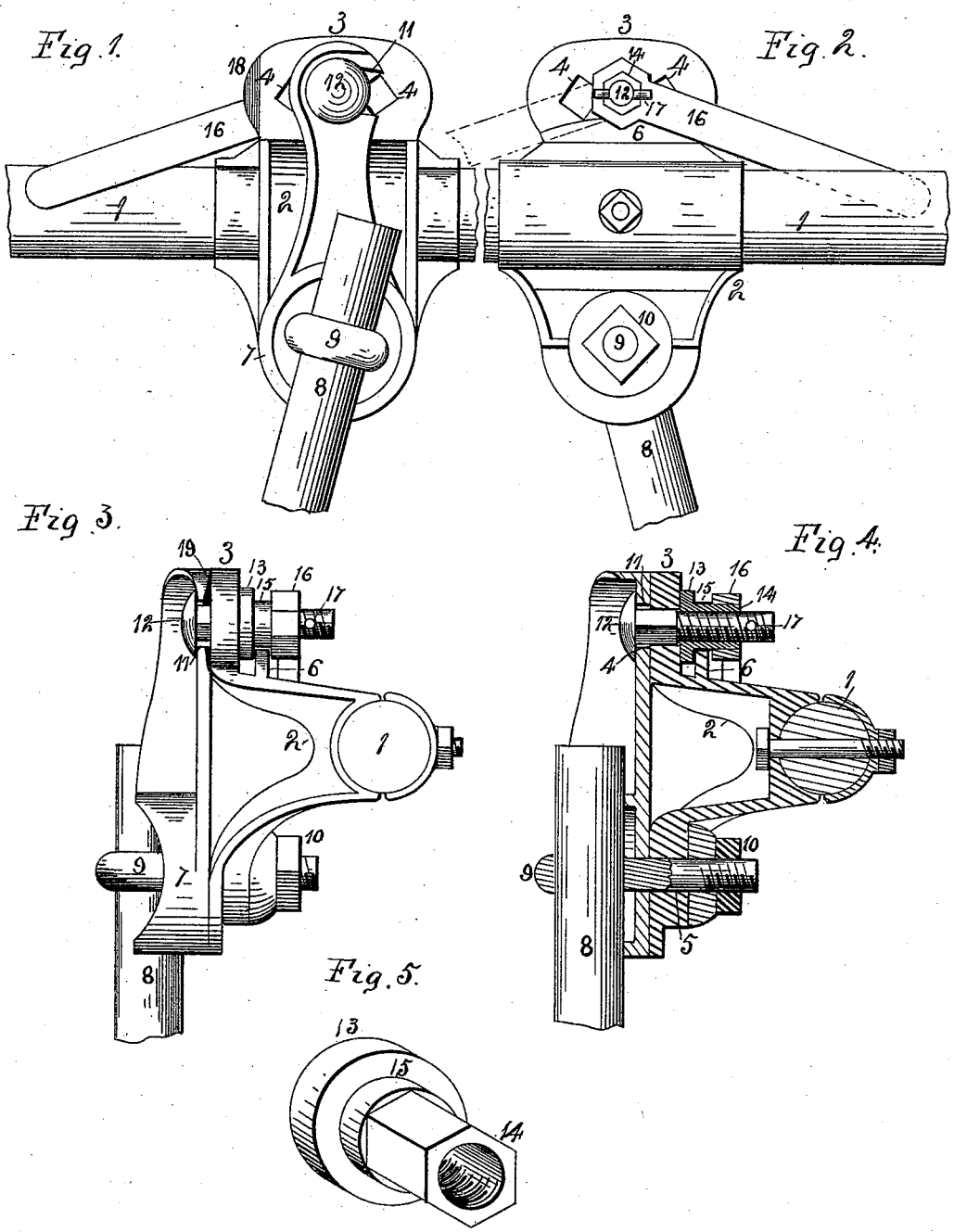

W. H. TRAPHAGEN.
CULTIVATOR.

No. 538,054. Patented Apr. 23, 1895.

Witnesses:
E. Behel.
Alice Sovereign.

Inventor:
William H. Traphagen
By A. O. Behel
Atty.

UNITED STATES PATENT OFFICE.

WILLIAM H. TRAPHAGEN, OF ROCKFORD, ILLINOIS, ASSIGNOR TO EMERSON, TALCOTT & CO., OF SAME PLACE.

CULTIVATOR.

SPECIFICATION forming part of Letters Patent No. 538,054, dated April 23, 1895.

Application filed September 18, 1894. Serial No. 523,424. (No model.)

*To all whom it may concern:*

Be it known that I, WILLIAM H. TRAPHAGEN, a citizen of the United States, residing at Rockford, in the county of Winnebago and State of Illinois, have invented certain new and useful Improvements in Cultivators, of which the following is a specification.

The object of this invention is to construct a friction slip for cultivator shovels, in which a screw threaded bolt is employed held against rotation but capable of a limited endwise movement, and a nut capable of a rotary movement but held against lengthwise movement.

Figure 6:
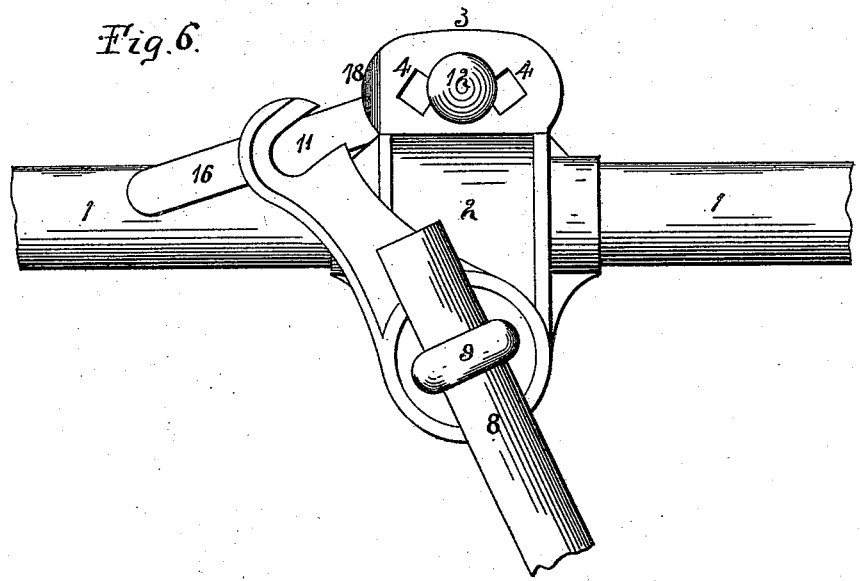
Figure 7:
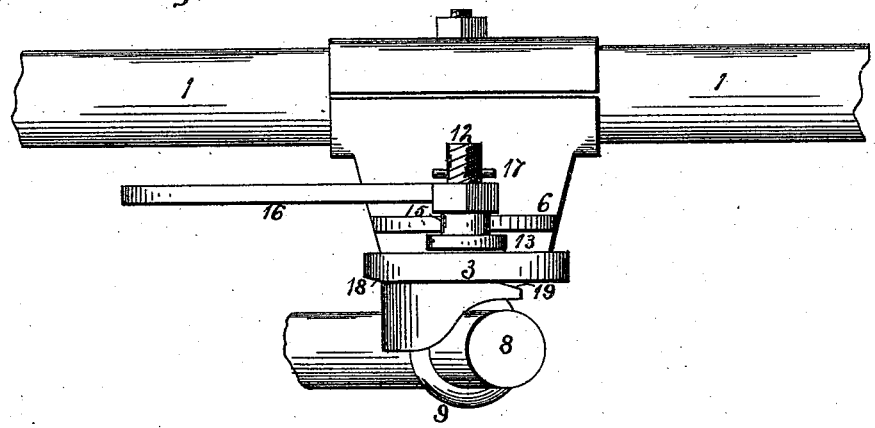
Figure 8:
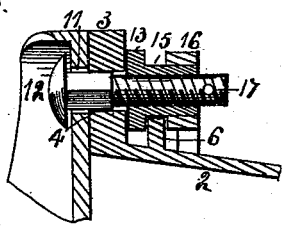

In the accompanying drawings, Figure 1 is an elevation of a section of drag bar and shovel standard with my improved friction slip as seen from the standard side. Fig. 2 is an elevation of the device as seen from the reverse side to that shown at Fig. 1. Fig. 3 is rear elevation. Fig. 4 is a vertical central section. Fig. 5 is an isometrical representation of the nut to be placed upon the screw threaded bolt. Fig. 6 is an elevation similar to Fig. 1, in which the shovel standard has moved rearward. Fig. 7 is a plan view. Fig. 8 is a vertical central section in which the bolt has been moved endwise to allow the replacing of the standard support.

To the drag bar 1, is bolted a bracket 2, having its upper end 3, preferably provided with a series of square openings 4, but a single hole may answer, and its lower end having an opening 5. The upper face of this bracket is provided with a rib 6, extending in a vertical direction located some distance from the upper end 3, and having its upper surface curving and struck from the center of the opening 5, in the lower end of the bracket. Upon the face of this bracket is located a support 7, for a shovel standard having its lower end in socket form to receive the standard 8, and held in place by an eye bolt 9, passing through the opening 5, in the lower end of the bracket 2, and clamped in position by the nut 10. The upper end of this standard support is provided with a slot 11, in its rear face. Within one of the openings is located a screw threaded bolt 12, its shank portion near its head being squared to fit within the opening and held thereby from rotating, but free to have an endwise sliding movement.

A nut shown at Fig. 5, is internally screw threaded having a flanged head 13, preferably circular and a section of its length 14, fitted to receive a wrench and a smaller portion 15, preferably circular forming a stop for the wrench and riding upon the rib 6, holding the bolt in a horizontal position. This nut is turned upon the bolt 12, its head being located between the upper end of the bracket and the rib, which will prevent endwise movement of the nut, and the shank portion of the bolt fitting the opening in the upper portion of the bracket will prevent rotation of the bolt, but is free to move endwise upon the turning of the nut. A wrench 16, is preferably located upon the nut and a pin 17 passed through the bolt near its end preventing a displacement of the wrench.

In use the support for the shovel standard support stands in a vertical position and the slotted upper end passed under the head of the bolt 12, as shown at Fig. 1. The nut is then turned to bring the head of the bolt against the face of the support with sufficient support to hold the shovel standard in proper position for use. The wrench 16, is placed on the end of the nut and will occupy the position shown in solid lines at Figs. 1 and 2. The pin is then passed through the bolt to hold the wrench in position upon the nut when the parts will appear as shown in the drawings.

When sufficient force has been brought to bear upon the shovel it will force the upper end of the shovel standard support from engagement with the face of the bracket 2, and head of the bolt 12, permitting the shovel to move rearward until the obstruction has been passed, and during this movement it will be noticed that the position of the bolt 12, nut and wrench 16, have not been changed. The attendant will move the wrench from the position in solid lines Fig. 2, to that shown in dotted lines same figure, and this movement will turn the nut which being held by the upper end of the bracket 2, and rib 6, from endwise movement will force the bolt in its lengthwise direction toward its head end, a sufficient distance to permit the upper end of the shovel standard support to pass between the face of the bracket and head of the bolt The wrench is then turned into its solid line position which will draw the bolt into its lengthwise direction moving its head against the face of the upper end of the shovel standard support clamping it against the face of the bracket. The friction induced by the head of the bolt 12, against the shovel standard support may be varied by removing the pin 17, from the bolt 12, and adjusting the wrench upon the nut, it being intended that the wrench when the friction is applied shall rest against the upper surface of the bracket or other stop, and the extent of the lengthwise movement of the bolt will depend upon the pitch given to its threads.

I have stated that the shovel standard support stands in a vertical position but do not limit myself to such location as the upper end of the support may be at an angle to its main portion.

The upper end of the bracket is provided with a series of square holes in order that the shovel may be adjusted to stand at different angles by changing the location of the bolt 12, and the object of curving the upper face of the rib 6, is to present a stop for the bolt when it is located in any of the series of holes, but if a single hole be employed a stop sufficient to limit the endwise movement of the nut will answer. The front face of the bracket at its upper end is beveled or cut away as shown at 18, and the inner face of the upper end of the standard support is cut away as shown at 19, in order that the support may be brought into engagement with bracket after it has been released therefrom by the pressure brought to bear upon it. In this instance the standard and its support are in separate pieces but in some constructions of cultivators they are made in one piece and such could be used in connection with my improved slip.

I claim as my invention—

1. A slip for cultivator shovels consisting of a stationary bracket, a support for a shovel having a pivotal connection with the bracket, the support and bracket having a frictional engagement through the medium of a bolt, the bolt supported by the bracket, and held against lengthwise movement when in its normal condition.

2. A slip for cultivator shovels consisting of a bracket, a support for the shovel, a bolt engaging the same held against rotation, but capable of a lengthwise movement, and a nut receiving the bolt capable of a rotary movement, but held against lengthwise movement.

3. A slip for cultivator shovels, consisting of a bracket a support for the shovel, a bolt engaging the same held against rotation but capable of a lengthwise movement, a nut receiving the bolt capable of a rotary movement but held against lengthwise movement, a wrench connected to the nut and means for holding it in position.

4. A slip for cultivator shovels, consisting of a bracket a support for the shovel, having a pivotal connection with the bracket, a bolt supported by the bracket, its head clamping the support to the bracket, a nut receiving the bolt having a head located between a portion of the bracket and a rib extending from the bracket, a bolt capable of a lengthwise movement but not a rotary movement and the nut capable of a rotary movement but not a lengthwise movement.

5. A slip for cultivator shovels consisting of a socket and shovel support having a frictional engagement, the meeting faces of the bracket and support being beveled at their upper ends.

WILLIAM H. TRAPHAGEN.

Witnesses:
A. O. BEHEL,
E. BEHEL.